United States Patent
Hamada

Patent Number: 6,118,481
Date of Patent: *wx.–99,–9999

[54] SOLID STATE IMAGE PICK-UP DEVICE AND IMAGE PICK-UP APPARATUS

[75] Inventor: Minoru Hamada, Ogaki, Japan

[73] Assignee: Sanyo Electric Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/004,211

[22] Filed: Jan. 8, 1998

[30] Foreign Application Priority Data

Jan. 10, 1997 [JP] Japan ................................. 9-003114

[51] Int. Cl.[7] ........................... H04N 5/222; H04N 3/14; H04N 5/225

[52] U.S. Cl. ........................ 348/220; 348/333; 348/317

[58] Field of Search .................................... 348/311, 312, 348/315, 308, 317, 220, 221, 272, 273, 276, 333; 257/242

[56] References Cited

U.S. PATENT DOCUMENTS

| | | | |
|---|---|---|---|
| 4,541,010 | 9/1985 | Alston | 348/333 |
| 4,712,135 | 12/1987 | Hashimoto et al. | 348/220 |
| 4,740,828 | 4/1988 | Kinoshita | 348/333 |
| 4,954,900 | 9/1990 | Frane | 348/317 |
| 5,737,098 | 4/1998 | Sayag | 348/317 |
| 5,754,229 | 5/1998 | Elabel | 348/317 |

*Primary Examiner*—Wendy Garber
*Assistant Examiner*—Alicia M Harrington
*Attorney, Agent, or Firm*—Hogan & Hartson, LLP

[57] ABSTRACT

Chip area is reduced using a CCD solid state image pick-up device of a frame transfer system. Permanent accumulation pixels for accumulating information charges in a first imaging operation to photograph a coarse image and a second imaging operation to photograph a fine image, and selective accumulation pixels for accumulating information charges in only the second imaging operation are arranged in an image pick-up section 11$i$ of a solid state image pick-up device 11. The permanent accumulation pixels are disposed every, for example, three rows of the selective accumulation pixels. The number of rows of a storage section 11$s$ is arranged to correspond with the number of rows of the permanent accumulation pixels of the image pick-up section 11$i$. The permanent accumulation pixel and the selective accumulation pixel have the same construction on a substrate and are distinguished by frame transfer clocks $\phi a$ and $\phi b$ to be supplied.

11 Claims, 5 Drawing Sheets

SOLID STATE IMAGE PICK-UP DEVICE AND IMAGE PICK-UP APPARATUS

BACKGROUND OF THE INVENTION

1. Field of the Invention

The present invention relates to a CCD solid state image pick-up device of a frame transfer system and an image pick-up apparatus constituted so as to obtain a still image by the use of the solid state image pick-up device.

2. Description of the Related Art

Electronic still cameras using a solid state image pick-up device are used for introducing image information into a computer apparatus such as a personal computer or a word processor. This electronic still camera is constructed so that object images may be photographed as motion images, namely, a continuity of still images in a manner similar to a conventional image pick-up apparatus such as a TV camera, and so that image information of one desired frame may then be extracted out from the images. Usually, in the processing of the image information of such an electronic still camera in order to speed-up processing, the continuous images are reproduced using image signals having a small amount of information which has been reduced and complete signal processing is performed only for the image information of the single frame to be finally extracted.

FIG. 1 is a block diagram showing a construction of the electronic still camera, and FIG. 2 is a timing chart for explaining its operation.

A CCD solid state image pick-up device 1 has a plurality of light receiving pixels arranged in a matrix form and shift registers made to correspond to the light receiving pixels, respectively. The plurality of light receiving pixels generate and accumulate information charges in response to a light which is irradiated to a light receiving surface by a well-known lens mechanism and which corresponds to an object image. The shift register transfers and outputs the information charges accumulated in the light receiving pixels in accordance with a predetermined order. In the solid state image pick-up device 1, a capacitance for accumulating the information charge as a pixel unit is disposed at an output terminal of the shift register. A charge amount of the information charges to be transferred and output is converted into a voltage value and is then taken out, and a voltage signal of the voltage value is output as an image signal Y0(t).

A driving circuit 2 supplies a multiphase vertical transfer clock $\phi v$ and a multiphase horizontal transfer clock $\phi h$ to each of the shift registers of the solid state image pick-up device 1. Each shift register receives these clocks, thereby transferring and outputting the information charges accumulated in the plurality of light receiving pixels in accordance with a predetermined order. That is to say, the information charges are transferred from the light receiving pixels to the shift registers of the solid state image pick-up device 1 at a timing in accordance with a vertical sync signal VT, and the information charges are then transferred and output one row by one row at a timing in accordance with a horizontal sync signal HT, whereby the image signal Y0(t) is obtained. A timing control circuit 3 generates the horizontal sync signal HT and the vertical sync signal VT on the basis of a reference clock of a predetermined period and supplies these signals to the driving circuit 2. The horizontal sync signal HT and the vertical sync signal VT are used to decide timings of a horizontal scan and a vertical scan of the solid state image pick-up device 1, and are formed in accordance with a predetermined television system. The timing control circuit 3 also generates a timing signal PC for standardizing the image signal Y0(t) in accordance with the horizontal sync signal HT and vertical sync signal VT and supplies the generated signal to a signal processing circuit 4 which will be described hereinafter. The timing control circuit 3 also responds to an image deciding instruction DI, thereby stopping a continuous imaging operation of the driving circuit 2 and allowing the signal processing circuit 4 to output image data D(n) of a specified frame corresponding to the image signal Y0(t).

The signal processing circuit 4 retrieves the image signal Y0(t) output from the solid state image pick-up device 1, executes various processes such as sample-and-hold and level correction of the image signal Y0(t) in accordance with the timing signal PC to form an image signal Y1(t) corresponding to a predetermined format, and then supplies the thus formed signal to a display 5. This signal processing circuit 4 has an A/D converter and a D/A converter and is constituted so that signal processing may be performed on the image signal Y0(t) as digital data, and, after completion of the predetermined signal processing, the image signal Y0(t) may be returned to the image signal Y1(t) of an analog value and the returned signal may be then supplied to the display 5. Furthermore, when the timing control circuit 3 receives the image deciding instruction DI, the signal processing circuit 4 supplies the digital image data D(n) of one frame formed from the image signal Y0(t) to the outside as a still image output. The display 5 comprises an LCD panel and the like, and continuously displays images photographed by the solid state image pick-up device 1 in accordance with the image signal Y1(t) which is supplied from the signal processing circuit 4. In this connection, subsequent to the image deciding instruction DI, the display 5 displays a still image corresponding to the image data D(n) output as a still image output.

FIG. 3 is a schematic view showing the construction of the CCD solid state image pick-up device 1 of the frame transfer system. FIG. 4 is a timing chart showing relations between the sync signals and transfer clocks for driving the solid state image pick-up device 1. In this drawing, an arrangement of the light receiving pixels is shown in a matrix of 12 rows×16 columns only in order to simplify the drawing.

The CCD solid state image pick-up device 1 of the frame transfer system comprises an image pick-up section 1$i$, a storage section 1$s$, a horizontal transfer section 1$h$, and an output section 1$d$. The image pick-up section 1$i$ is constituted of a plurality of CCD shift registers which are extended in a vertical direction and arranged mutually in parallel. Each bit of these shift registers constitutes the light receiving pixel. A multiphase frame transfer clock $\phi f$ which is synchronized with the vertical sync signal VT is supplied to this image pick-up section 1$i$, so that the information charges accumulated in the light receiving pixels during an imaging period are transferred to the storage section 1$s$ at a high speed within a vertical scan blanking period.

The storage section 1$s$ comprises a plurality of CCD shift registers which continues to shift registers of the image pick-up section 1$i$. Each CCD shift register of the storage section 1$s$ has the same bit number as that of the shift register of the image pick-up section 1$i$, and the information charges transferred from the light receiving pixels of the image pick-up section 1$i$ are temporarily stored in the bits of the shift registers. The multiphase vertical transfer clock $\phi v$ synchronized with the vertical sync signal VT and the horizontal sync signal HT is supplied to this storage section 1$s$, and the information charges are fetched as a frame unit from the image pick-up section 1i. The storage section 1s transfers the fetched information charges to the horizontal transfer section 1h as a row unit within a horizontal scan blanking period.

The horizontal transfer section 1h comprises a single CCD shift register whose bits are connected to outputs of the shift registers of the storage section 1s and receive the information charges transferred and output from the shift registers of the storage section 1s. The multiphase horizontal transfer clock φh synchronized with the horizontal sync signal HT is supplied to the horizontal transfer section 1h. The horizontal transfer section 1h sequentially transfers the information charges transferred and output from the shift registers of the storage section 1s to the output section 1d side in units of one horizontal line.

The output section 1d includes a capacitance for receiving the information charges on the output side of the horizontal transfer section 1h, receives the information charges transferred and output from the horizontal transfer section 1h into the capacitance, and outputs a voltage value corresponding to a charge amount of the received charges. A reset clock φr in accordance with the horizontal transfer clock φh is supplied to the output section 1d. The information charges sequentially transferred and output from the horizontal transfer section 1h are discharged on a pixel unit basis from the capacitance of the output section 1d, so that a voltage value corresponding to the amount of the information charge of each pixel is extracted. A change in voltage value to be output becomes the image signal Y0(t).

As for the solid state image pick-up device 1 of the frame transfer system as mentioned above, since the storage section 1s for temporarily storing the information charges obtained by imaging is separated from the light receiving pixels of the image pick-up section 1i, little leakage of unnecessary charges from the light receiving pixels occurs. Therefore, the solid state image pick-up device of the frame transfer system is suitable for the electronic still camera in which information charges are read out from the solid state image pick-up device at an arbitrary timing, thereby obtaining a still image.

For the foregoing electronic still camera, motion images are formed by successively operating the solid state image pick-up device 1. The user watches the motion images and can extract a desired still image included in the motion images. A high picture quality is not required in the motion image at this time because the motion image is merely used for confirmation by the user. Therefore, ordinarily, an information amount of the image signal Y0(t) is previously set to be small, so that the signal process in the signal processing circuit 4 is simplified. That is to say, the image signal Y0(t) is reduced on a predetermined column or row unit basis at an input stage of the signal processing circuit 4 and the information amount is decreased, so that subsequent various signal processes are simplified, and high-speed processing can thereby be realized.

However, a configuration in which the image signal Y0(t) is reduced and carried to the signal processing circuit 4 creates a problem that a circuit scale of the signal processing circuit 4 is increased and electric power consumption in the sections also increases. The solid state image pick-up device 1 itself of the frame transfer system having the image pick-up section 1i and the storage section is also has a problem that, as compared with a solid state image pick-up device of an interline transfer system in which a vertical transfer section is disposed between columns of light receiving pixels arranged in a matrix form, a chip area is large and manufacturing costs rise.

SUMMARY OF THE INVENTION

It is an object of the present invention to provide an inexpensive cheap electronic still camera having a high performance by realizing a decrease in costs while suppressing an increase in electric power consumption.

According to the present invention, there is provided a solid state image pick-up device comprising an image pick-up section in which a plurality of light receiving pixels are arranged in a matrix form and which accumulates in the light receiving pixels information charges generated by a photoelectric conversion; a storage section in which a plurality of storage pixels are arranged in a matrix form and which stores in the storage pixels the information charges transferred and output every column from the light receiving pixels; and a horizontal transfer section for receiving the information charges transferred and output every row from the storage pixels and for sequentially transferring and outputting the information charges.

In this invention, the image pick-up section includes first rows in which permanent accumulation pixels for successively accumulating information charges in both of first and second imaging operations are arranged and second rows which are arranged suitably in number between the first rows and in which selective accumulation pixels for exhausting the information charges in the first imaging operation and for accumulating the information charges in the second imaging operation are arranged, and the storage section includes third rows which are arranged in such numbers as to correspond to the number of the first rows and in which the storage pixels are arranged.

According to the present invention, as the third rows are arranged in the storage section so as to correspond to the first rows in which the permanent accumulation pixels for accumulating information charges in both of the first and second imaging operations are continuous, the area of the storage section is reduced as compared with the area of the image pick-up section in accordance with a ratio of the number of first rows and the number of second rows. Therefore chip area is reduced, even for the frame transfer system.

Further, according to the invention, there is provided an image pick-up apparatus for executing a first imaging operation of repeatedly imaging an object to obtain a first image signal with continuous image information of a plurality of frames and a second imaging operation of obtaining an object image corresponding to one of the continuous images displayed by the first image signal by a new exposure, thereby obtaining a second image signal including image information of one frame.

This image pick-up apparatus comprises a solid state image pick-up device in which a storage section in which third rows where storage pixels for temporarily storing information charges are arranged are disposed in accordance with the number of first rows is made to correspond to an image pick-up section in which the first rows where permanent accumulation pixels for successively accumulating the information charges in both of first and second imaging operations are arranged and second rows where selective accumulation pixels for exhausting the information charges in the first imaging operation and for accumulating the information charges in the second imaging operation are arranged are disposed in accordance with a predetermined rule; a shutter mechanism which is disposed on an optical path of a light irradiated onto a light receiving section, which is continuously opened in the first imaging operation, and which shades the image pick-up section of the above solid state image pick-up device in the second imaging operation after being opened for a predetermined period of time; and a driving circuit which, in the first imaging operation, transfers the information charges from the first rows of the image pick-up section to the third rows of the storage section of the solid state image pick-up device, afterward transfers and outputs the information charges every row, and then, in the second imaging operation, transfers and outputs the information charges every row from the first and second rows of the image pick-up section through the third rows of the storage section of the solid state image pick-up device.

According to the invention, the shutter mechanism is not operated in the first imaging operation to repeatedly capture a coarse image in the apparatus, but is operated in the second imaging operation to capture a fine image in the apparatus only once, so that the shutter mechanism consumes an electric power only for the short period of the second imaging operation. At the same time, the number of rows in the storage section of the solid state image pick-up device of the frame transfer system is reduced and information charges are accumulated in the light receiving pixels in the image pick-up section only by an amount as much as the number of rows of the storage section, so that an image signal can be obtained in a state in which the number of rows has been previously reduced.

DETAILED DESCRIPTION OF THE PREFERRED EMBODIMENT

Figure 5:
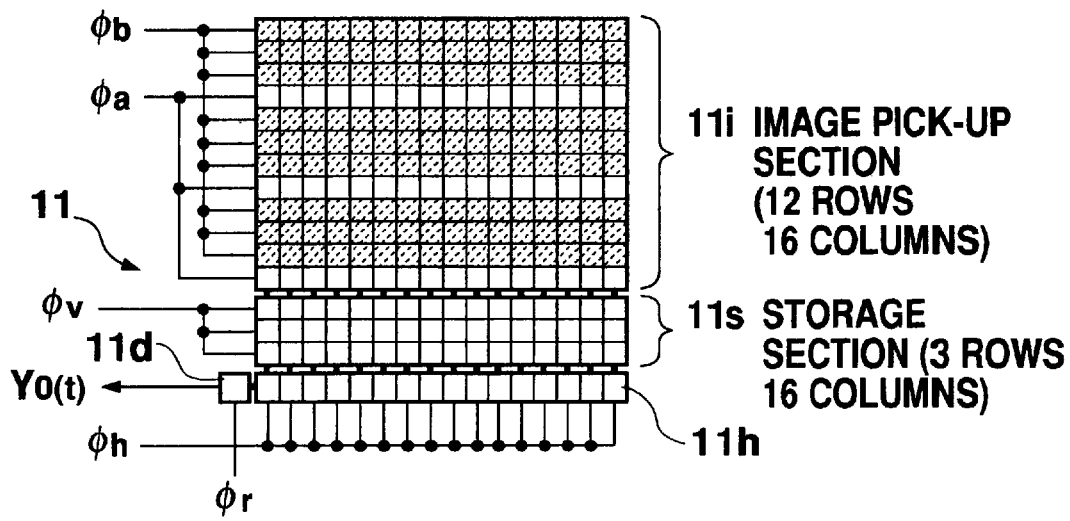
FIG. 5 is a plan view schematically showing a solid state image pick-up device of the present invention.

FIG. 5 is a schematic view showing a construction of a CCD solid state image pick-up device 11 of the frame transfer system according to the present invention. In the diagram, in order to simplify the drawing, an arrangement of light receiving pixels is shown in a matrix of 12 rows×16 columns. For the light receiving pixels, an arrangement in which a row comprising permanent accumulation pixels for accumulating charges in both of first and second imaging operations is inserted every three rows, each comprising selective accumulation pixels for accumulating charges in only the second imaging operation is shown as an example.

Figure 1:
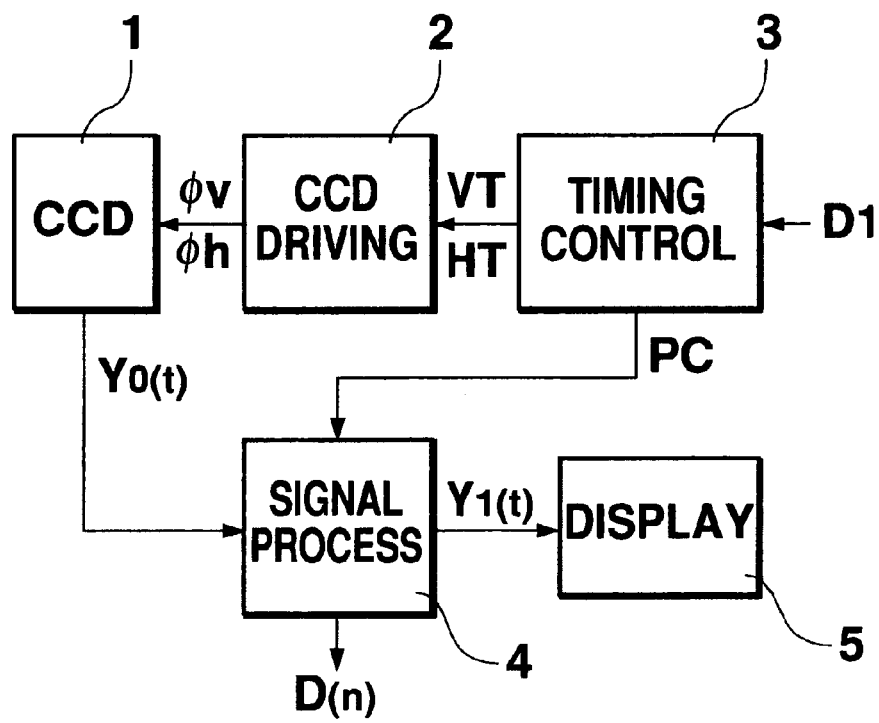
FIG. 1 is a block diagram showing a construction of a conventional image pick-up apparatus.
Figure 2:
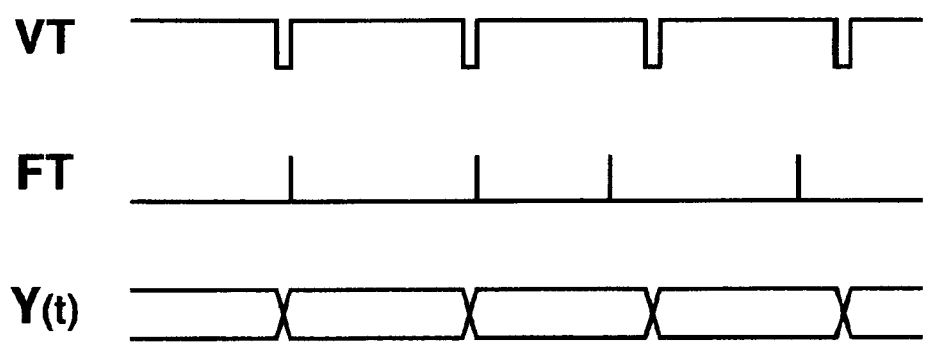
FIG. 2 is a timing chart for explaining the operation of the conventional image pick-up apparatus.
Figure 3:
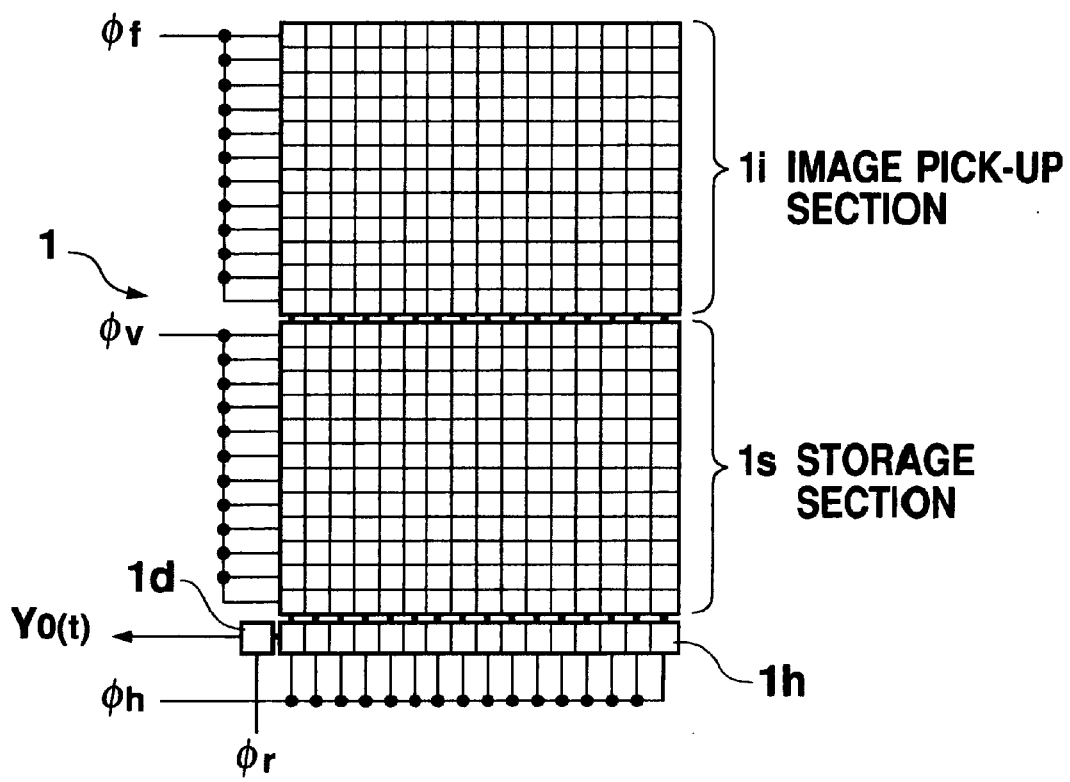
FIG. 3 is a plan view schematically showing a conventional solid state image pick-up device of a frame transfer system.
Figure 4:
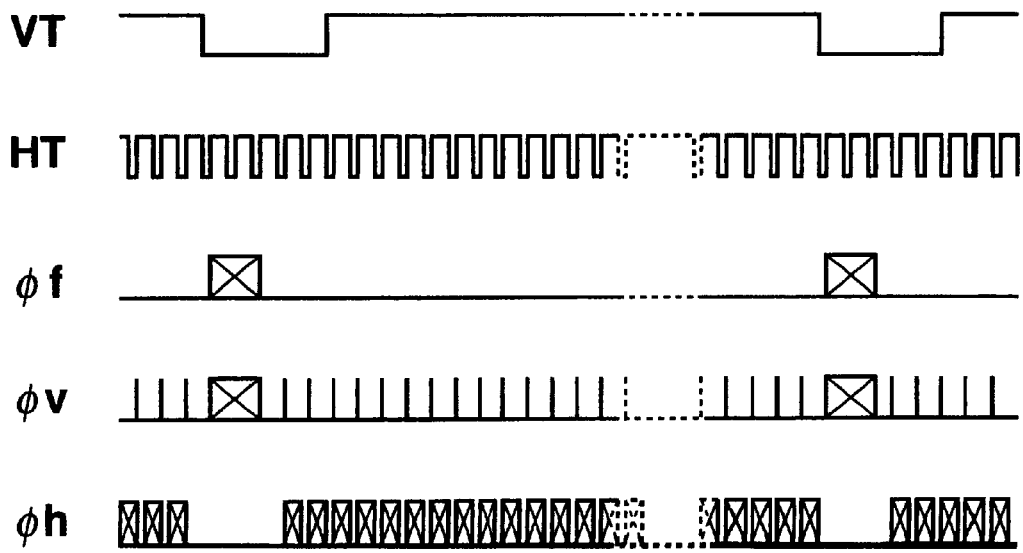
FIG. 4 is a timing chart for explaining the operation of the solid state image pick-up device of the frame transfer system.

The CCD solid state image pick-up device 11 of the frame transfer system comprises an image pick-up section 11$i$, a storage section 11$s$, a horizontal transfer section 11$h$, and an output section 11$d$. The image pick-up section 11$i$ is constructed of a plurality of CCD shift registers which are extended in the vertical direction and arranged in parallel. A bit of each of the shift registers constructs a light receiving pixel. The light receiving pixels include the selective accumulation pixels which do not accumulate information charges in the first imaging operation in which the solid state image pick-up device 11 photographs a coarse image but accumulate information charges in the second imaging operation in which the solid state image pick-up device 11 photographs a fine image; and the permanent accumulation pixels which accumulate information charges in both imaging operations. These permanent accumulation pixels and selective accumulation pixels are arranged in the direction of rows, respectively, thereby forming first rows (shown by portions which are not hatched in the diagram) and second rows (shown by hatched portions in the diagram). The first rows are arranged one row at a time in order to provide constant intervals. The second rows are arranged in suitable numbers between the first rows. In the diagram, a case where the second rows are arranged by three rows among the first rows is shown. A multiphase first frame transfer clock $\phi$a is supplied to the first rows and a multiphase transfer clock $\phi$b is supplied to the second rows. The pixel structure for each row is the same. The permanent accumulation pixel and selective accumulation pixel are distinguished due to the clocks supplied to the pixels. When the information charges accumulated in the light receiving pixels are transferred, the first frame transfer clock $\phi$a and the second frame transfer clock $\phi$b are harmonized, thereby transferring (frame transfer) the information charges to the storage section 11$s$. In the first imaging operation, the operation to transfer the information charges from the image pick-up device 11$i$ to the storage section 11$s$ is performed at a high speed at a timing synchronized with the vertical sync signal VT in a manner similar to the image pick-up section 1$i$ of the solid state image pick-up device 1 shown in FIG. 3. To the contrary, in the second imaging operation, the operation to transfer the information charges from the image pick-up section 11$i$ to the storage section 11$s$ is not executed at a high speed but the transferring operation is performed one row by one at a period in accordance with the horizontal scan in a manner similar to the storage section 1s of the solid state image pick-up device 1 shown in FIG. 3.

The storage section 11$s$ comprises a plurality of CCD shift registers continuously connected to the shift registers of the image pick-up section 11$i$. The information charges transferred from the permanent accumulation pixels of the image pick-up section 11$i$ are temporarily stored in bits of the shift registers. The number of rows of the storage section 11$s$ corresponds with the number of rows of the first rows of the image pick-up section 11$i$, namely, the number of the permanent accumulation pixels in the shift register of the image pick-up section 11$i$.

In the diagram, the storage section 11$s$ is formed in a matrix of 3 rows×16 columns in which the number of rows is equal to ¼ of that of the image pick-up section 11$i$. The multiphase vertical transfer clock $\phi$v synchronized with the vertical sync signal VT or horizontal sync signal HT is supplied to each row of the storage section 11$s$. In the first imaging operation, the storage section 11$s$ fetches the information charges from the permanent accumulation pixels of the image pick-up section 11$i$ at a period that is four times as long as that of the first and second frame clocks $\phi$a and $\phi$b and transfers the fetched information charges one row by one every horizontal scan period to the horizontal transfer section 1$h$.

In the second imaging operation, the period of the vertical transfer clock φv is made to coincide with periods of the first and second frame transfer clocks φa and φb. The storage section 11s operates as an extending portion of the shift registers of the image pick-up section 11i and sequentially transfers the information charges from the permanent accumulation pixels and selective accumulation pixels to the horizontal transfer section 11h.

The horizontal transfer section 11h comprises a single CD shift register whose bits are connected to respective outputs of the shift registers of the storage section 11s. The bits of the horizontal transfer section 11h receive the information charges transferred and output from the shift registers of the storage section 11s. The horizontal transfer section 11h has the same construction as that of the horizontal transfer section 1h of the solid state image pickup device 1 shown in FIG. 3. By supplying the multiphase horizontal transfer clock φh synchronized with the horizontal sync signal HT, the information charges in the horizontal transfer section 11h transferred and output every horizontal line from the shift registers of the storage section 11s are sequentially transferred to the output section 11d side. The output section 11d includes a capacitance for receiving the information charges on the output side of the horizontal transfer section 11h, receives the information charges output from the horizontal transfer section 11h, and outputs a voltage value corresponding to an amount of the information charges.

The reset clock φr is supplied in accordance with the horizontal transfer clock φh to the output section 11d. By exhausting the information charges which have already been accumulated in the capacitance before the information charges of the next pixel are output from the horizontal transfer section 11h, the voltage value corresponding to the information charge amount every pixel is extracted. A change in voltage value to be output becomes the image signal Y0(t).

Figure 6:
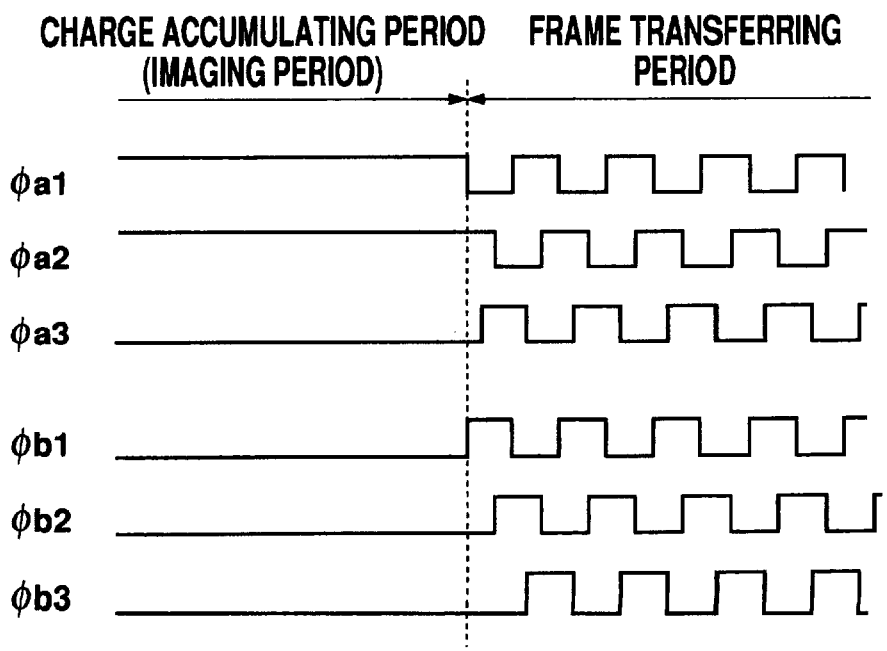
FIG. 6 is a waveform diagram of frame transfer clocks at the time of a first imaging operation.

FIG. 6 is a waveform diagram of a charge accumulation period (imaging period) and the clocks φa and φb of the frame transfer period at the time of the first imaging operation and shows a case of a three-phase driving.

For the three-phase driving, three electrodes are disposed, for each pixel of the image pick-up section 11i of the solid state image pick-up device 11. These electrodes control a potential in a substrate in accordance with potentials of the clocks to be supplied. Information charges are stored into a portion in which the potential is deeply formed (potential well). A pixel separation is performed in a portion in which the potential is shallowly formed (potential barrier). During the imaging period, as shown in FIG. 6, at least one of first frame clocks φa1 to φa3 having different phases is fixed to a high potential and at least one of them is fixed to a low potential. In this instance, the clocks φa1 and φa2 of the first and second phases are fixed to a high potential and the clock φa3 of the third phase is fixed to a low potential. Information charges are thereby accumulated under the electrodes to which the clocks φa1 and φa2 are supplied. With respect to the second frame clocks φb1 to φb3, since all are fixed to a low potential, no information charge is accumulated in the selective accumulation pixels to which the second frame clocks φb1 to φb3 are supplied. That is to say, in the first imaging operation, no information charge is accumulated in the selective accumulation pixels to which the second frame clocks φb1 to φb3 are supplied. In the selective accumulation pixels, since the information charges occur due to a photoelectric conversion, the second frame clocks φb1 to φb3 are periodically set to a potential for exhausting charges, thereby preventing that the information charges generated in the selective accumulation pixels mixedly enter the permanent accumulation pixels.

After the elapse of a predetermined imaging period, as shown in FIG. 6, the first frame clocks φa1 to φa3 and the second frame clocks φb1 to φb3 are clocked at the same timing, so that the information charges accumulated in the permanent accumulation pixels are transferred to the storage section 11s. At this time, the vertical clock φv for fetching the information charges in the storage section 11s is set to a period that is four times as long as those of the first and second frame clocks φa and φb and the information charges to be output from the image pick-up section 11i once per four pixels are sequentially fetched to the storage section 11s. The information charges fetched in the storage section 11s are sequentially transferred to the horizontal transfer section 11h every row at a horizontal scanning period in accordance with the vertical frame clock φv in a manner similar to the solid state image pick-up device 1 shown in FIG. 3.

Figure 7:
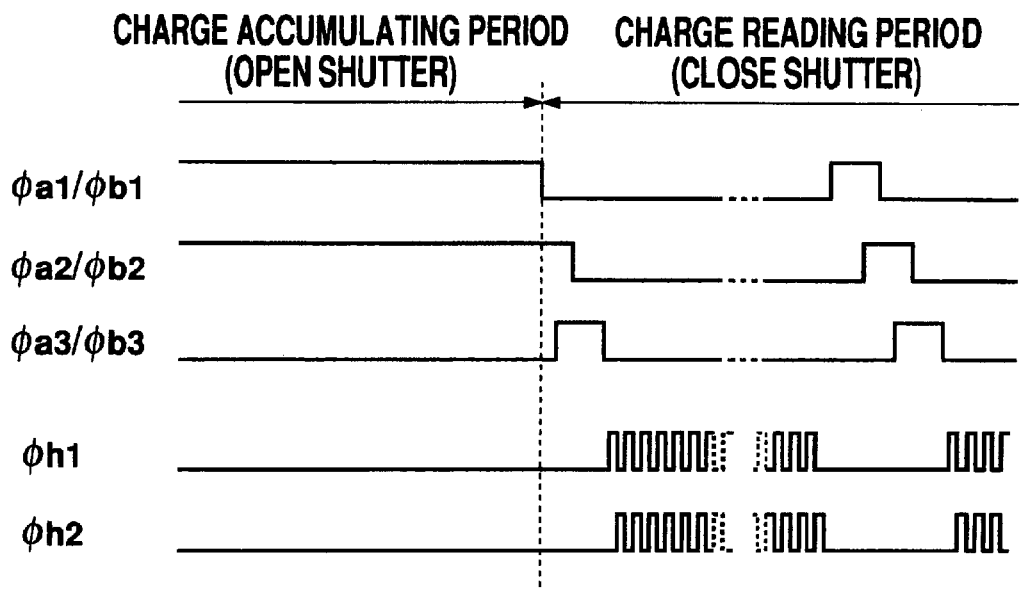
FIG. 7 is a waveform diagram of frame transfer clocks and a horizontal transfer clock at the time of a second imaging operation.

FIG. 7 is a waveform diagram of the frame transfer clocks φa and φb and the horizontal transfer clock φh for a charge accumulating period and a charge reading period at the time of the second imaging operation and shows a case of the three-phase driving of the frame transfer clocks φa and φb and a two-phase driving of the horizontal transfer clock φh.

In the second imaging operation, the first frame transfer clocks φa1 to φa3 and the second frame transfer clocks φb1 to φb3 are changed at the same phase without being distinguished. For the charge accumulating period, the clocks φa1/φb1 and φa2/b2 of the first and second phases are fixed to a high potential and the clocks φa3/φb3 of the third phase are fixed to a low potential. A potential well is thereby formed under the electrodes to which the clocks φa1/φb1 and φa2/φb2 are supplied, thereby accumulating the information charges. In the second imaging operation, since the frame transferring operation is not performed, the shutter mechanism for optically shading the image pick-up section 11i of the solid state image pick-up device 11 is used.

After a predetermined charge accumulating period is completed, the shutter mechanism is closed, thereby shading the image pick-up section 11i. The period then enters the charge reading period and the information charges accumulated in the light receiving pixels in the image pick-up section 11i are transferred and output every row at a timing in accordance with the horizontal scanning period. At this time, the storage section 11s operates so as to merely connect each of the shift registers of the image pick-up section 11i and each bit of the shift register of the horizontal transfer section 11h. The vertical transfer clock φv changes at the same phase as those of the frame transfer clocks φa and φb. Consequently, the information charges accumulated in all of the light receiving pixels of the image pick-up section 11i for the charge accumulating period are transferred and output in row units for the charge reading period subsequent to the charge accumulating period.

Figure 8:
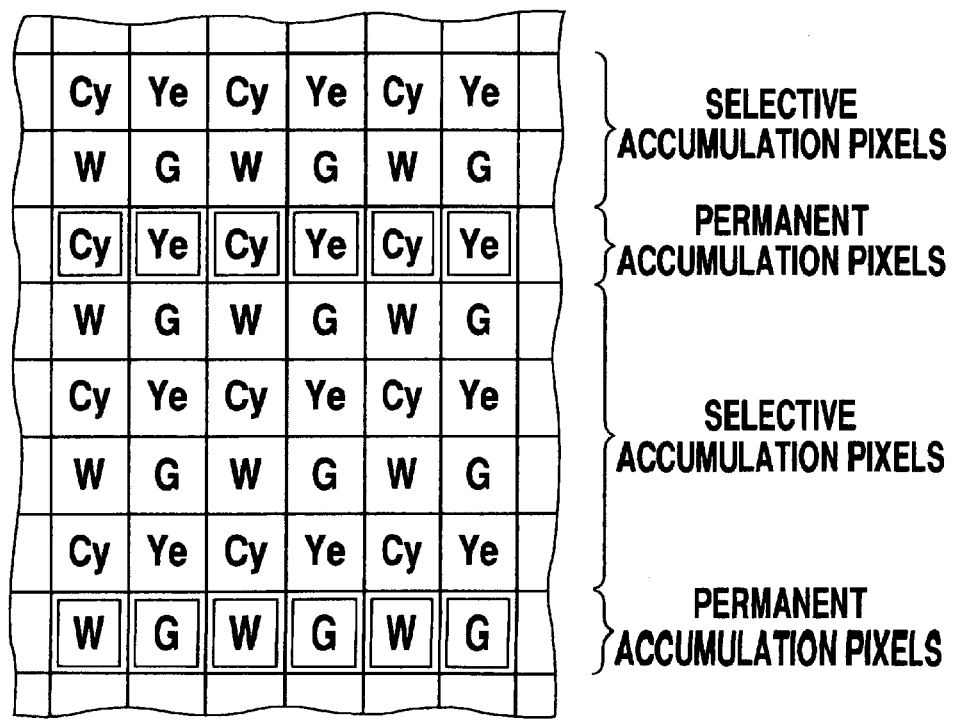
FIG. 8 is a plan view showing a construction of a mosaic-shaped color filter.

When the solid state image pick-up device 11 is used for color imaging, a color filter is often attached to the image pick-up section 11i, thereby causing the light receiving pixels correspond to specified color components. In this instance, when the color filter is a mosaic filter in which the arrangement of color components differs every row, it is necessary to arrange the permanent accumulation pixels and the selective accumulation pixels in accordance with the arrangement of the color components. For example, as shown in FIG. 8, when cyan (Cy) and yellow (Ye) are alternatively arranged in odd rows, and white (W) and green (G) are alternatively arranged in even rows, if the rows including the permanent accumulation pixels are selected every three rows, only either one of a combination of Cy/Ye and a combination of W/G is obtained. Therefore, it is sufficient that eight columns of the light receiving pixels are set to one unit and two pixels having different color components (third and eighth rows) among them are selected as permanent accumulation pixels. Deviation of pixels by about 1 or 2 rows creates no problem in the first imaging operation to allow the solid state image pick-up device 11 to operate at a low resolution. Consequently, in the first imaging operation to photograph a coarse image, it is possible to independently extract all of color components in a manner similar to the second imaging operation to read the information charges from all of the light receiving pixels.

Figure 9:
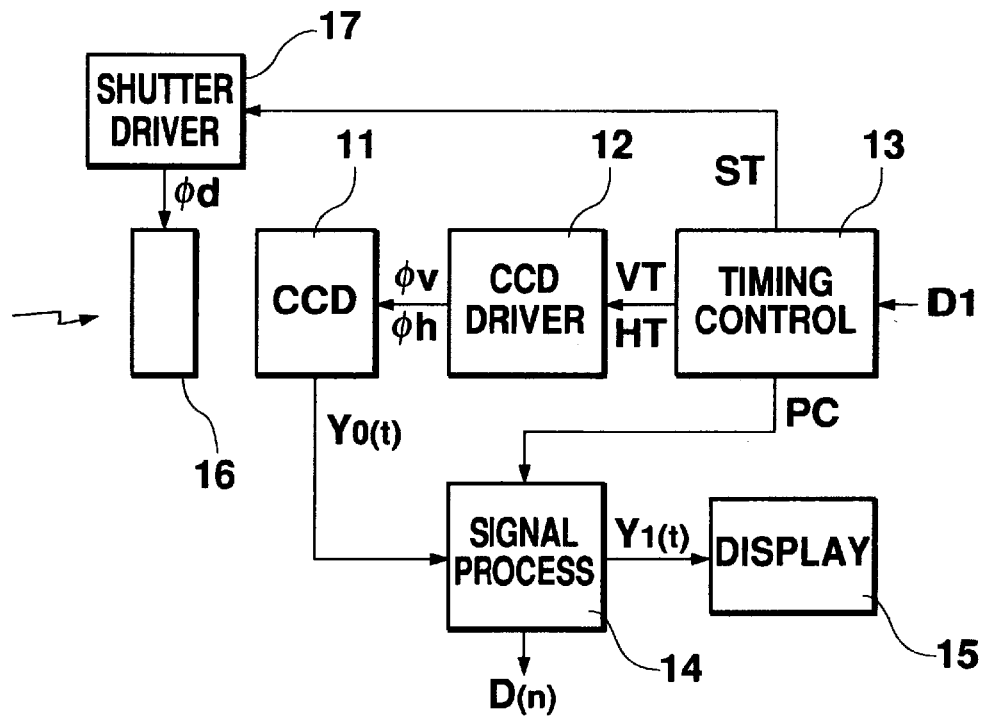
FIG. 9 is a block diagram showing a construction of an image pick-up apparatus of the invention.
Figure 10:
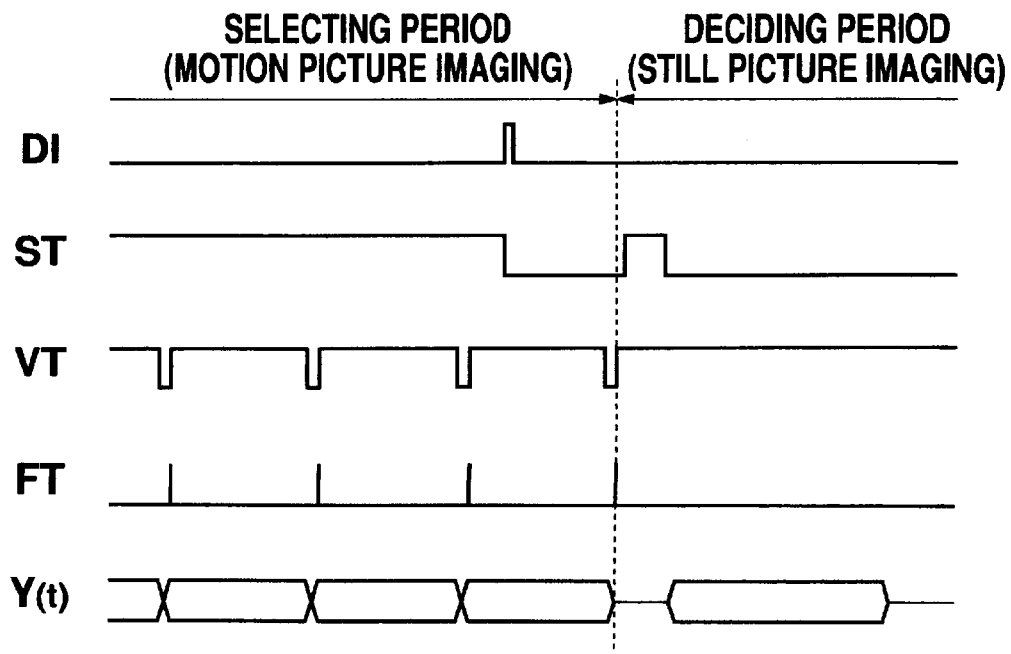
FIG. 10 is a timing chart for explaining the operation of the image pick-up apparatus of the invention.

FIG. 9 is a block diagram showing a construction of an electronic still camera as an image pick-up apparatus of the present invention in which a still image can be obtained by using the solid state image pick-up device 11 shown in FIG. 5.

The CCD solid state image pick-up device 11 is the device shown in FIG. 5. The device 11 includes the storage section 11s in which the number of rows is reduced as compared with that of the image pick-up section 11i and is driven by various clocks which are supplied from a driving circuit 12, thereby outputting the image signal Y0(t).

A shutter mechanism 16 is arranged on an optical path in which an object image is projected to the image pick-up section 11i of the solid state image pick-up device 11 via a well-known lens mechanism and shades the image pick-up section 11i at need. As a shutter mechanism 16, it is possible to use a mechanism capable of controlling a transmission of a light, so that it is considered that a liquid crystal panel, a shading plate, or the like is used. A shutter driving circuit 17 generates a driving clock φd on the basis of a shutter control signal ST which is supplied from a timing control circuit 13, which will be explained hereinafter, and opens or closes the shutter mechanism 16. For example, the shutter driving circuit opens the shutter mechanism 16 for a period of time during which the shutter control signal ST is in the leading edge and closes the shutter mechanism for a period of time during which the signal ST is in the trailing edge.

The driving circuit 12 supplies the multiphase frame transfer clocks φa and φb, vertical transfer clock φv, and horizontal transfer clock φh to the shift registers of the solid state image pick-up device 11, thereby transferring and outputting the information charges accumulated in a plurality of light receiving pixels in accordance with a predetermined order. That is to say, the information charges accumulated in the light receiving pixels of the image pick-up section 11i after the elapse of a predetermined charge accumulating period are transferred and output for each pixel in a predetermined order, so that the continuous image signals Y0(t) are obtained in line units. The transferring operation of the information charges in the solid state image pick-up device 11 is performed in accordance with the clock waveform diagram shown in FIG. 6 or 7.

The timing control circuit 13 allows the solid state image pick-up device 11 to continuously operate in the first imaging operation, thereby obtaining the image signal Y0(t) to display motion images and allows the solid state image pick-up device to operate only once in the second imaging operation, thereby obtaining the image signal Y0(t) for display of a still image. At the same time, the timing control circuit 13 instructs the shutter driving circuit 17 for driving the shutter mechanism 16, which shades the image pick-up section 11i of the solid state image pick-up device 11, to open the shutter mechanism 16 in the first imaging operation and to close the shutter mechanism 16 in the second imaging operation so as to shade the image pick-up section 11i of the solid state image pick-up device 11 after a predetermined period of time during which the shutter mechanism 16 is opened.

In the first imaging operation, the timing control circuit 13 generates the horizontal sync signal HT and vertical sync signal VT on the basis of a reference clock of a predetermined period and supplies them to the driving circuit 12, thereby allowing the driving circuit 12 to periodically operate. Consequently, the solid state image pick-up device 11 repeatedly the imaging operation by using only the permanent accumulation pixels of the image pick-up section 11i and outputs the image signal Y0(t) in which the number of rows is reduced to ¼. At this time, the shutter control signal ST is held in the leading edge and the shutter driving circuit 17 maintains the shutter mechanism 16 which is opened as it is. During the first imaging operation, the timing control circuit 13 simultaneously generates the timing signal PC to standardize the image signal Y0(t) and then supplies the generated signal to a signal processing circuit 14.

When the image deciding instruction DI is input to the timing control circuit 13 in a state in which the first imaging operation is continued, the first imaging operation is finished at the time point and the operation is shifted to the second imaging operation. In the second imaging operation, the shutter control signal ST is first trailed and the shutter mechanism 16 is once closed, so that the image pick-up section 11i of the solid state image pick-up device 11 is shaded. The frame transferring operation is performed in this state, so that the information charges accumulated in the light receiving pixels of the image pick-up section 11i are exhausted. For the exhausting operation, it is sufficient that, after the shutter mechanism 16 is closed, the operation similar to the first imaging operation is repeated once.

After completion of the exhausting operation of unnecessary charges, the shutter control signal ST is raised for a predetermined period of time and the shutter mechanism 16 is opened, so that all of the light receiving pixels of the image pick-up section 11i of the solid state image pick-up device 11 accumulate information charges. An opening time of the shutter mechanism 16 is set so as to be adjusted to a luminance of an object and is set so that an average of the amount of information charges to be accumulated in the image pick-up section 11i of the solid state image pick-up device 11 lies within a predetermined range. In this instance, it is considered that the optimum shutter opening time is set on the basis of an average level of the image signal Y0(t) at the time of the first imaging operation and is also set by directly measuring the luminance of the object. In the second imaging operation, the solid state image pick-up device 11 does not perform the frame transferring operation, for that reason it is necessary to shade the image pick-up section 11i by the shutter mechanism. In the image pick-up section 11i shaded by the shutter mechanism 16, the information charges accumulated in the light receiving pixels of the number of rows that is larger than that of the storage section 11s are read out in row units.

The signal processing circuit 14 fetches the image signal Y0(t) output from the solid state image pick-up device 11, executes various processes such as sample-and-hold and level correction in accordance with the timing signal PC, and supplies the resultant signal as an image signal Y1(t) in accordance with a predetermined format to a display 15. The signal processing circuit 14 has an A/D converter and a D/A converter and is constructed in such a manner that a signal process is performed to the image signal Y0(t) as digital data, after completion of the predetermined signal process, the processed signal is returned to the image signal Y1(t) of an analog value, and the returned signal is supplied to the display 15. The signal processing circuit 14 repeats the above signal process as a first imaging operation for a period of time until the timing control circuit 13 receives the image deciding instruction DI. After the timing control circuit 13 received the image deciding instruction DI, the signal processing circuit 14 supplies digital image data D(n) corresponding to the image signal Y0(t) indicative of the information charges from all of the light receiving pixels of the image pick-up section 11*i* of the solid state image pick-up device 11 as a still image output to the outside. At this time, the signal processing circuit 14 also supplies the image signal Y1(t) which corresponds to the still image output and whose number of pixels is not reduced to the display 15. The display 15 is constructed by an LCD panel or the like and continuously displays images photographed by the solid state image pick-up device 11 in accordance with the image signal Y1(t) supplied from the signal processing circuit 14.

As mentioned above, by changing the substantial number of light receiving pixels of the solid state image pick-up device 11 in the first and second imaging operations, the signal process of the signal processing circuit 14 is simplified in the first imaging operation to obtain coarse motion images.

Although the above embodiment has been described for a case in which the number of rows of the storage section 11*s* of the solid state image pick-up device 11 is reduced to ¼ of the number of rows of the image pick-up section 11*i*, it is also possible to reduce to another fraction, such as ⅛ or 1/16.

According to the invention, a chip size of the solid state image pick-up device can be decreased and manufacturing costs of the solid state image pick-up device can be reduced. By using the same solid state image pick-up device, the first imaging operation to obtain a coarse motion image and the second imaging operation to obtain a fine still image can be realized. In the first imaging operation, since an image signal in which the number of rows has been previously reduced can be obtained, the signal process to the image signal can be simplified. The shutter mechanism for covering the image pick-up section of the solid state image pick-up device operates for only a short period of time, so that the electric power consumption of the shutter mechanism is small.

Therefore, it is possible to obtain a still image with high picture quality, while reducing as costs of the solid state image pick-up device and the solid image pick-up apparatus.

What is claimed is:

1. A solid state image pick-up device comprising:

an image pick-up section in which a plurality of light receiving pixels are arranged in a matrix form and which accumulates in said light receiving pixels information charges generated by photoelectric conversion;

a storage section in which a plurality of storage pixels are arranged in a matrix form and which stores in said storage pixels the information charges transferred and output for every column from said light receiving pixels; and a horizontal transfer section for receiving the information charges transferred and output for every row from said storage pixels and for sequentially transferring and outputting the information charges, wherein:

said image pick-up section includes first rows, in which light receiving pixels for successively accumulating the information charges in both of first and second imaging operations are arranged, and second rows, which are arranged suitably in number between said first rows, and in which light receiving pixels for exhausting the information charges in said first imaging operation and for accumulating the information charges in said second imaging operation are arranged, wherein at least some of the first rows and some of the second rows accumulate information charges simultaneously during the second imaging operation, and said storage section includes third rows which are arranged in a number corresponding to the number of said first rows and in which said storage pixels are arranged.

2. The device according to claim 1, wherein the said first rows and second rows are individually driven in the first imaging operation, and said first rows and said second rows are commonly driven in the second imaging operation.

3. The device according to claim 2, wherein a color filter, which is divided into a plurality of segments in correspondence to said plurality of light receiving pixels and in which said segments are made to correspond to specified color components, is attached so as to cover said image pick-up section, and an arrangement order of said first rows and said second rows is decided in accordance with an arrangement rule in the column direction of color components of the segments of said color filter and a ratio of the number of said second rows to the number of said first rows.

4. An image pick-apparatus for executing a first imaging operation of repeatedly imaging an object to obtain a first image signal in which image information of a plurality of frames is continuous, and a second imaging operation of obtaining an object image corresponding to one of continuous images displayed by said first image signal by a new exposure, thereby obtaining a second image signal including image information of one frame, said image pick-up apparatus comprising:

a solid state image pick-up device in which a storage section in which third rows where storage pixels for temporarily storing information charges are arranged disposed in accordance with the number of first rows, is made to correspond to an image pick-up section in which said first rows where light receiving pixels for successively accumulating the information charges in both of first and second imaging operations are arranged, and second rows where light receiving pixels for exhausting the information charges in the first imaging operation and for accumulating the information charges in the second imaging operation are arranged disposed according to a predetermined rule, wherein at least some of the first rows and some of the second rows accumulate information charges simultaneously during the second imaging operation; a shutter mechanism which is disposed on an optical path of a light irradiated onto a light receiving section, which is continuously opened in the first imaging operation, and which shades said image pick-up section of said solid state image pick-up device in the second imaging operation after being opened for a predetermined period of time; and a driving circuit which, in the first imaging operation, transfers the information charges from the first rows of the image pick-up section to the third rows of the storage section of said solid state image pick-up device, transfers and outputs the information charges every row, and then, in the second imaging operation, transfers and outputs the information charges every rows from the first and second rows of the image pick-up section through the third rows of the storage section of said solid state image pick-up device.

5. The apparatus according to claim 4, wherein an opening time of said shutter mechanism at the time of said second imaging operation is controlled in response to an output level of said solid state image pick-up device.

6. A solid state image pick-up device comprising:

an image pick-up section which comprises a plurality of vertical shift registers arranged in parallel and in which bits of said vertical shift registers are light receiving pixels for generating and accumulating information charges corresponding to an incident light, said light receiving pixels being disposed in a matrix arranged in both the row and column directions;

a storage section which is constructed by a plurality of parallel vertical shift registers connected to outputs of said vertical shift registers constructing said image pick-up section; and a horizontal shift register for sequentially receiving information charge packets output from said vertical shift registers of said storage section, respectively, and for horizontally transferring and outputting said plurality of information charge packets, wherein said image pick-up section is constructed by a plurality of first rows in which said bits driven by first driving pulses are arranged in the horizontal direction and a plurality of second rows in which said bits driven by second driving pulses are arranged in the horizontal direction, wherein at least some of the first rows and some of the second rows accumulate information charges simultaneously during a second imaging operation and only the first rows accumulate information charges during a first imaging operation, said first rows and said second rows are vertically arranged in accordance with a predetermined rule, and each of said vertical shift registers of said storage section has the number of bits corresponding to the number of rows of said first rows included in said image pick-up section.

7. The device according to claim 6, wherein said image pick-up section includes permanent accumulation areas comprising said first row and selective accumulation areas comprising one or more of said second rows, and said permanent accumulation areas and said selective accumulation areas are alternatively arranged in the vertical direction.

8. The device according to claim 7 further comprising a color filter in which a plurality of segments, through which light corresponding to different color components are transmitted are arranged at a predetermined cycle, which is attached onto said plurality of light receiving pixels, and wherein each of said selective accumulation areas comprises the second rows, the number of said second rows being an integer multiple of an arrangement cycle in the column direction of said color components of said segments.

9. A solid image pick-up apparatus comprising:

a solid state image pick-up device;

a shutter mechanism capable of blocking an incidence of a light to an image pick-up section of said solid state image pick-up device; and a driving circuit for controlling the operations of said solid state image pick-up device and said shutter mechanism, wherein said solid state image pick-up device comprises:

an image pick-up section which comprises a plurality of vertical shift registers arranged in parallel and in which a bit of each of said vertical shift registers is a light receiving pixel for generating and accumulating information charges corresponding to incident light, and said light receiving pixels are disposed in a matrix arranged in the row and column directions;

a storage section which comprises a plurality of parallel vertical shift registers connected to outputs of said vertical shift registers constructing said image pick-up section; and a horizontal shift register for sequentially receiving information charge packets generated from said vertical shift registers of said storage section, and for horizontally transferring and outputting said plurality of information charge packets, wherein:

said image pick-up section comprises a plurality of first rows in which said bits driven by first driving pulses are arranged in the horizontal direction and a plurality of second rows in which said bits driven by second driving pulses are arranged in the horizontal direction, said first and second rows are vertically arranged in accordance with a predetermined rule, each of said vertical shift registers of said storage section has a number of bits corresponding to the number of said first rows included in said image pick-up section, said driving circuit is constructed in such a manner that, by using said first driving pulse and said second driving pulse in a motion picture imaging operation mode, said first rows and said second rows are individually driven so that only said light receiving pixels constructing said first rows accumulate said information charges and, in a still picture imaging operation mode, said first rows and said second rows are commonly driven so that both of said light receiving pixels constructing said first rows and said light receiving pixels constructing said second rows accumulate said information charges, in said motion picture imaging operation mode, said shutter mechanism is kept in an open state and said information charges accumulated in said light receiving pixels constructing said first rows of said image pick-up section are transferred to said storage section at a high speed, subsequently, while the next one of said information charges is accumulated to said image pick-up section, said information charges transferred and held in said storage section are sequentially output to said horizontal shift register in row units, and in said still picture imaging operation mode, said image pick-up section is shaded by said shutter mechanism, and said information charges accumulated in said light receiving pixels constructing said first rows of said image pick-up section and said light receiving pixels constructing said second rows of said image pick-up section are sequentially output one row at a time to said horizontal shift register through said storage section.

10. The apparatus according to claim 9, wherein, in said image pick-up section, permanent accumulation areas comprising said first row and selective accumulation areas comprising one or a plurality of said second rows are included, and said permanent accumulation areas and said selective accumulation areas are alternatively arranged in the vertical direction.

11. The apparatus according to claim 9, wherein said driving circuit is constructed in such a manner that in a reading operation of said information charges in said motion picture imaging operation mode, said vertical shift registers of said storage section are driven interlockingly with a timing at which said information charges generated in permanent accumulation areas comprising at least one first row are output from said vertical shift registers of said image pick-up section, thereby shifting one bit at a time, and, in a reading operation of said information charges in said still picture imaging operation mode, said vertical shift registers of said image pick-up section and said vertical shift register of said storage section are synchronously driven by common driving pulses.

* * * * *